United States Patent
Hehl

(10) Patent No.: US 6,517,754 B1
(45) Date of Patent: Feb. 11, 2003

(54) METHOD FOR EVALUATING INJECTION MOULDED PARTS

(76) Inventor: Karl Hehl, Arthur-Hehl-Strasse 32, D-72290 Lossburg (DE)

( * ) Notice: Subject to any disclaimer, the term of this patent is extended or adjusted under 35 U.S.C. 154(b) by 0 days.

(21) Appl. No.: 09/600,249
(22) PCT Filed: Jan. 5, 1999
(86) PCT No.: PCT/EP99/00018
§ 371 (c)(1), (2), (4) Date: Jul. 13, 2000
(87) PCT Pub. No.: WO99/37462
PCT Pub. Date: Jul. 29, 1999

(30) Foreign Application Priority Data

Jan. 20, 1998 (DE) .......................... 198 01 881

(51) Int. Cl.$^7$ ........................ B29C 45/76; B29C 45/77
(52) U.S. Cl. ................. 264/40.1; 264/40.5; 264/328.1; 700/200
(58) Field of Search .............................. 264/40.1, 40.4, 264/40.5, 40.7, 328.1; 425/135, 140, 145, 148, 149; 700/200, 203

(56) References Cited

U.S. PATENT DOCUMENTS

| 5,173,223 A | * | 12/1992 | Kamiguchi et al. | ......... 264/40.1 |
| 5,291,423 A | | 3/1994 | Röösli | |
| 5,550,744 A | | 8/1996 | Steinbichler | |
| 5,800,748 A | * | 9/1998 | Kamiguchi et al. | ......... 264/40.1 |
| 5,815,397 A | * | 9/1998 | Saito et al. | ................. 264/40.1 |
| 5,871,676 A | * | 2/1999 | Fujita et al. | ............. 264/328.1 |
| 6,019,917 A | * | 2/2000 | Ryckebusch et al. | .... 264/328.1 |

FOREIGN PATENT DOCUMENTS

| DE | 35 45 360 | 6/1987 |
| DE | 41 08 992 | 6/1996 |
| EP | 0 317 992 A2 | 5/1989 |
| EP | 0 452 513 A1 | 10/1991 |
| EP | 0 452 513 B1 | 2/1994 |
| EP | 0 665 433 A1 | 8/1995 |
| JP | 03036012 | 2/1991 |
| JP | 06231327 | 8/1994 |

OTHER PUBLICATIONS

*Grafische Unterstützung vereinfacht Bedienung*, Kunststoffe, München 1994, pp. 1388, 1392–94.

* cited by examiner

Primary Examiner—Jill L. Heitbrink
(74) Attorney, Agent, or Firm—Rabin & Berdo, PC

(57) ABSTRACT

A method is proposed for evaluating injection-molded parts, produced in an injection-molding machine, as a good molding or a bad molding. The method includes determining a respective curve of a first parameter (y), which curve indicates changes in the first parameter (y) as a function of a prescribed second parameter (x). The determining operation is performed during a plurality of injection-molding operations wherein non-defective good moldings are produced, to form a group of curves. The group of curves is averaged to form a mean value curve (M2, M3), which curve indicates a mean value of the curves of the first parameter (y) for each value of the second parameter (x). A standard deviation is calculated in dependence on at least one parameter. A permissible range (T) of the at least one parameter is set along the mean value curve (M2, M3) on the basis of the calculated standard deviation. An actual value assessment of the at least one parameter is effected, which is produced during an actual production of a molding, to check whether the actual value falls within a permissible range. A molding is assessed as a good molding when the actual value lies substantially within the permissible range (T), or respectively as a bad molding when the actual value does not lie within the permissible range. To set the permissible range (T), the standard deviation is calculated in dependence on the second parameter (x).

13 Claims, 3 Drawing Sheets

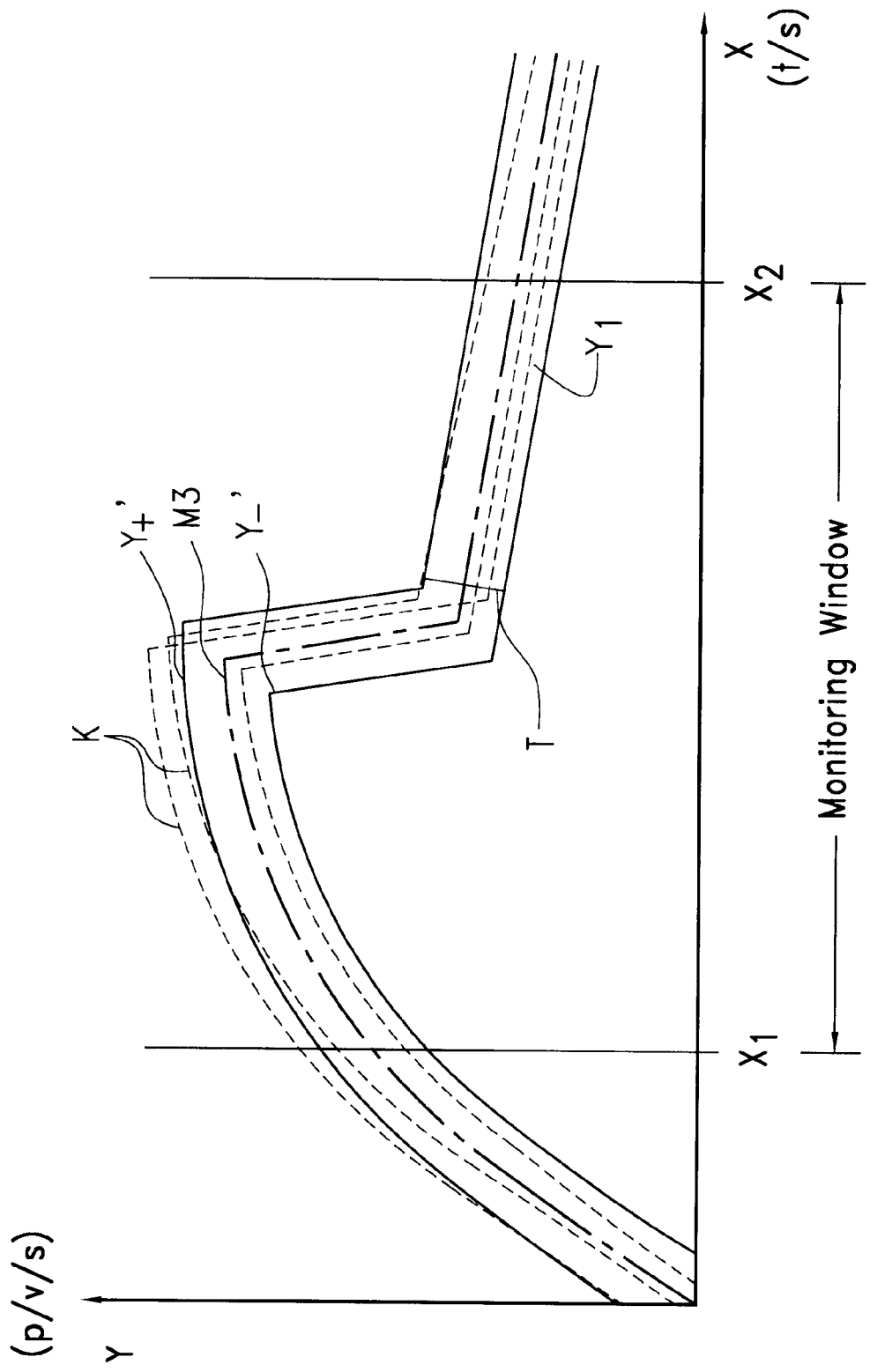

METHOD FOR EVALUATING INJECTION MOULDED PARTS

CROSS REFERENCE TO RELATED APPLICATION

The present invention claims the priority of German Patent Application 198 01 881.9, filed on Jan. 20, 1998, the disclosed content of which application is also hereby expressly made the subject-matter of the present invention.

BACKGROUND OF THE INVENTION

1. Field of the Invention

The invention relates to a method for evaluating injection-molded parts, which are produced in an injection-molding machine to determine if the molded parts are good or bad, and more especially a plastic injection-molding machine for processing plasticizable substances, such as plastics materials, pulverulent substances or ceramic substances.

2. Prior Art

Such a method is explained in an article by M. Hoyer and E. Duffner entitled "Grafische Unterstützung vereinfacht Bedienung" in: Kunststoffe 84 (1994), Book 10, Pages 1388–1394, and it is illustrated, more especially, in FIG. 6 there. A corresponding illustration of prior art is also found as FIG. 1 belonging to this application. In this prior art, a plurality of parameter curves are initially determined as a function of a second parameter, for example the internal mold pressure over the cycle time. The curves, whereby non-defective good moldings have been produced, are stored in such case. A mean value curve M1 is then formed from these curves. From the values which are available in the y direction, a standard deviation is now calculated in known manner, e.g. according to the formula:

$$\Delta y = z * \sqrt{\frac{1}{m-1}\left(\sum_{i=1}^{a} y_i^2 - \frac{1}{m}\left(\sum_{i=1}^{a} y_i\right)^2\right)}$$

with:

z=standard normal variable, e.g. z=3.29 for 99.9% control limit, m=number of measuring cycles, $y_i$=value of the first parameter in the $i^{th}$ measuring cycle.

For a constantly calculated curve deviation, the span width R is now calculated by:

$$R_i = \text{Max}_x\{|y_i(x)-y(x)|-\text{Min}_x(|y_i(x)-y(x)|)\}$$

with:

| |=absolute amount, y(x)=mean value of the first parameter y in dependence on the second parameter x.

Since an actual value curve $y_i(x)$ is equal to the reference curve y(x) at at least one point, $R_i$ can therefore be calculated, so that the tolerance can be calculated according to the formula:

$$\Delta y = z * \sqrt{\frac{1}{m-1}\left(\sum_{i=1}^{a} R_i^2 - \frac{1}{m}\left(\sum_{i=1}^{a} R_i\right)^2\right)}$$

An assessment can now be made as to whether or not, in a subsequent production cycle, the parameter curve lies within the permissible range given by the tolerance band. If the permissible range is departed from on one or more occasions, the molding is judged to be a bad molding, according to the assessment criteria, and it is rejected.

However, the disadvantage of this way of determining the tolerance band in a manner known per se is that the tolerance band, which is determined only in the y direction, becomes very narrow. In particular, often considerable fluctuations in the value of the first parameter, that is to say, for example, the internal mold pressure, the velocity or the screw path, such fluctuations possibly occurring, for example, during the transition from the mold filling phase to the dwell pressure phase. As such, plurality of injection-molding cycles therefore depart from the tolerance band at this point, with the consequence that moldings, which should still be accepted in terms of their quality when properly considered, are wrongly eliminated.

Similar methods are known, for example, from DE 35 45 360 A1. A good molding curve is also determined there, and such curve is also provided with a tolerance band possibly in sections. This tolerance band is formed by an upper envelope curve and a lower envelope curve, and the curves are produced from a plurality of good molding parameter curves. This envelope curve therefore includes all of the injection-molding cycles which have previously already resulted in good moldings. However, no tolerance band is determined hereby, and no consideration is even given to any influences which are not reflected in the curve pattern, such as, for example, a high level of energy consumption. Above all, however, no recognized statistical evidence regarding the quality of the moldings produced is hereby possible.

Apparent from EP-0 452 513 B1 is a method wherein pressure curves are plotted in dependence on one or more parameters. Parameter values for determining a permissible range can then also be inputted, if desired, in sections in dependence on these curves and the values determined thereby. After a certain lead time, the last three pressure curves are preferably considered, and corresponding values are selected by the user from a numerical table representing the various pressure curves and inputted by hand. No tolerance band calculation is hereby effected.

A means for regulating product properties is known from DE 41 08 992 C2, wherein the particular weight of the molding is correlated with the work applied by the piston to produce the molding. The molding, which is produced, is judged to be a good or bad molding in dependence on the work actually required. The bad molding is, therefore, only evaluated in dependence on one parameter.

A method of assessing good or bad moldings is known from EP 0 317 992 A2, wherein the temperature of the injection mold assembly, the molding substance, the plasticizing cylinder or the nozzle is correlated with the time. Here also, a molding is only assessed in dependence on one parameter.

It is known, from U.S. Pat. No. 5,550,744, to select a plurality of quality parameters and to determine, in dependence on the control parameters, data fields where the values of good moldings have to lie at the intersections of the fields. However, a tolerance band over the entire range is not, therefore, determined in dependence on only two parameters which equally determine the parameter curve. In consequence, the control work needed there for monitoring purposes is disproportionate to the evaluation obtained thereby, especially since the known problem also still arises here, i.e. that the tolerance band becomes narrowest at the precise location where the parameter fluctuations are the greatest.

SUMMARY OF THE INVENTION

On this basis, the basic object of the present invention is to calculate a tolerance band, by means of which calculation a suitable tolerance band is provided, and more especially, when there are considerable fluctuations in the monitored parameter, in order to reduce the reject rate further to the actual bad moldings.

This object is achieved by setting the permissible range using a standard deviation calculated in dependence on a second parameter.

Whereas, in known methods, the standard deviation has usually only been calculated hitherto in the y direction, in the present invention an additional calculation is now also effected in dependence on the x co-ordinate. This causes a wider tolerance band to be set, more especially in the regions where the monitored parameter fluctuates considerably in the y direction, so that injection-molding cycles now also still produce good moldings which would hitherto have been eliminated. However, since the tolerance band could already be exceeded in such manner, with minimal delays, e.g. delays with respect to time, solely by shifting the fluctuation range in the illustrations to the right, the reject rate is noticeably reduced thereby. Nevertheless, it is ensured that parameter curves, which lie outside this permissible range, cannot lead to good moldings, so that the products there can be reliably eliminated.

BRIEF DESCRIPTION OF THE FIGURES

In the drawings:

FIG. 3 illustrates a tolerance band curve which has been calculated perpendicular to the mean value curve.

DETAILED DESCRIPTION OF THE INVENTION

The invention is now explained in more detail, by way of example, with reference to the accompanying drawings. However, the embodiments are only examples which should not restrict the inventive concept to one specific physical arrangement.

Figure 1:
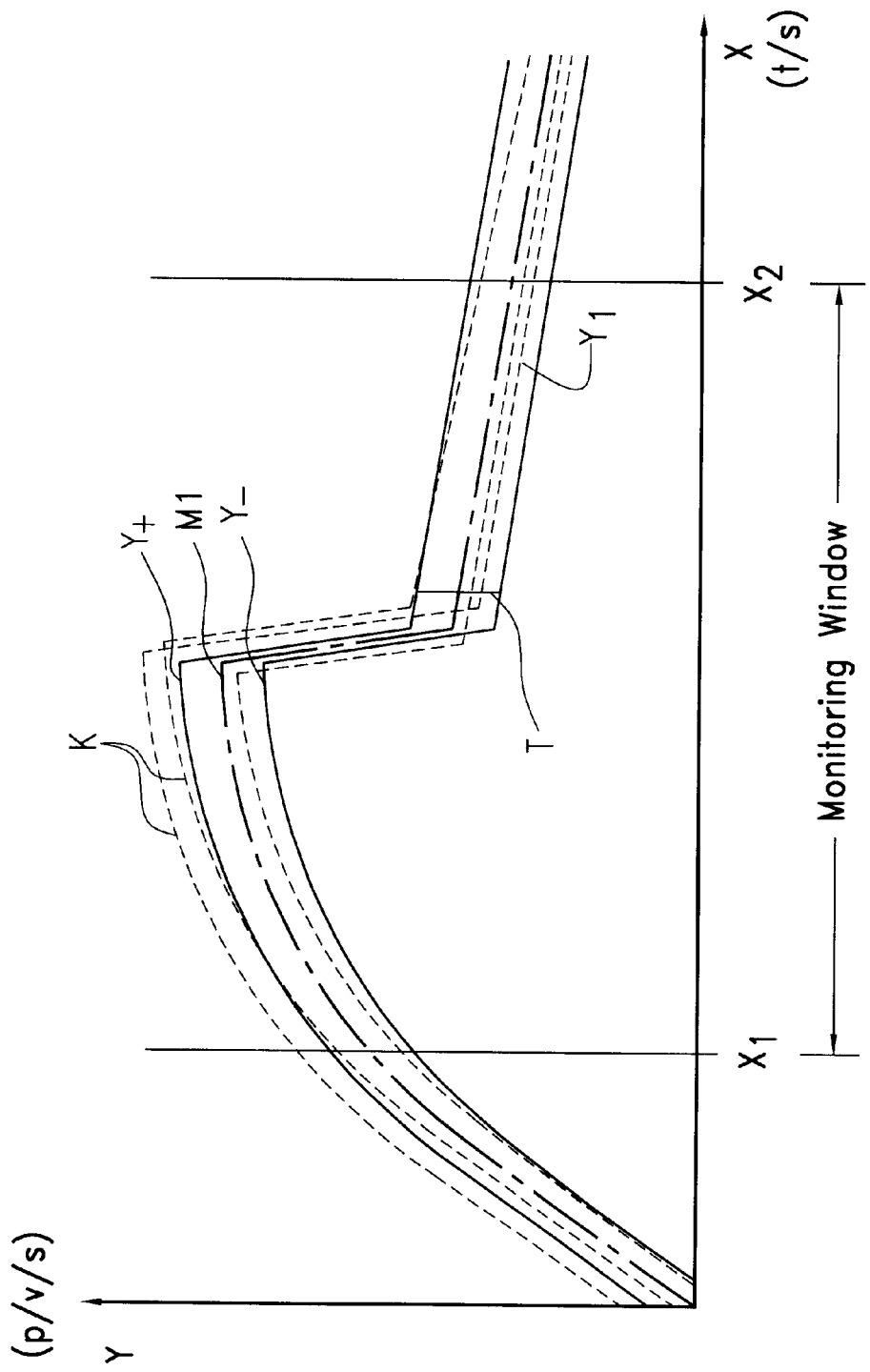
FIG. 1 illustrates a determination of the tolerance band according to prior art.

FIG. 1 initially illustrates the result of a method of determining a tolerance band, which was hitherto conventional in prior art. In such case, a prescribed second parameter x is indicated on the abscissa, and a first parameter y is indicated on the ordinate. The values, in brackets, for the pressure p, either hydraulic pressure or internal mold pressure, or the velocity v of the feeding means or the path s of the feeding means, can be used as the first parameter for y. The cycle time t or the path s of the feeding means is substantially considered as the second parameter.

Actual value curves K of the first parameter y, which indicate changes in the first parameter y during a plurality of injection-molding operations as a function of the prescribed second parameter x, are illustrated by the thin dashed lines in all of the Figures. For determining the tolerance band, therefore, injection-molding operations are preferably involved wherein non-defective good moldings are produced. The group of curves given thereby is subsequently averaged to form a mean value curve M1 in FIG. 1, which curve is also in fact shown as a dashed line, but it is drawn more thickly. For each value of the second parameter x, this mean value curve M1 indicates the mean value of the curves of the first parameter y. A calculated mean value curve M1 has therefore been formed from the stored curves K according to the formula:

$$y = 1/m \Sigma y_i$$

with:

y=mean value, $y_i$=value of the first parameter in the $i^{th}$ measuring cycle, m=number of measuring cycles.

A tolerance can be calculated therefrom, with a standard normal variable z=3.29 for 99.9% control limit, to be:

$$\Delta y = z * \sqrt{\frac{1}{m-1}\left(\sum_{i=1}^{a} y_i^2 - \frac{1}{m}\left(\sum_{i=1}^{a} y_i\right)^2\right)}$$

For a constantly calculated curve deviation, the span width R is now calculated by:

$$R_i \text{Max}_x\{|y_i(x)-y(x)| - \text{Min}_x(|y_i(x)-y(x)|)\}$$

with:

| |=absolute amount, $y_i(x)$=value of the first parameter as a function of the second parameter in the $i^{th}$ measuring cycle, y(x)=mean value of the first parameter y in dependence on the second parameter x.

Since an actual value curve $y_i(x)$ is identical to the mean value curve M1, and hence is identical to y(x), at at least one point, the tolerance can therefore be calculated to be:

$$\Delta y = z * \sqrt{\frac{1}{m-1}\left(\sum_{i=1}^{a} R_i^2 - \frac{1}{m}\left(\sum_{i=1}^{a} R_i\right)^2\right)}$$

This leads to the permissible range T shown by a solid line in FIG. 1. This permissible range T of the first parameter y is set along the mean value curve on the basis of the determined standard deviation. An actual value assessment of the first parameter, which is formed during the actual production of a molding, is effected hereinafter as a function of the second parameter to check whether the actual value falls within the permissible range T or not. If, therefore, the actual value curve K leaves the permissible range T during the concrete production of a subsequent injection-molding cycle, it is to be assumed that the molding, produced with this injection-molding cycle, is a bad molding. However, there are the possibilities here, known in prior art, to permit individual excesses and to introduce such as an additional assessment criterion to such an extent that a molding is only considered to be a bad molding when there are frequent departures from the tolerance band, and hence from the permissible range T.

Figure 2:
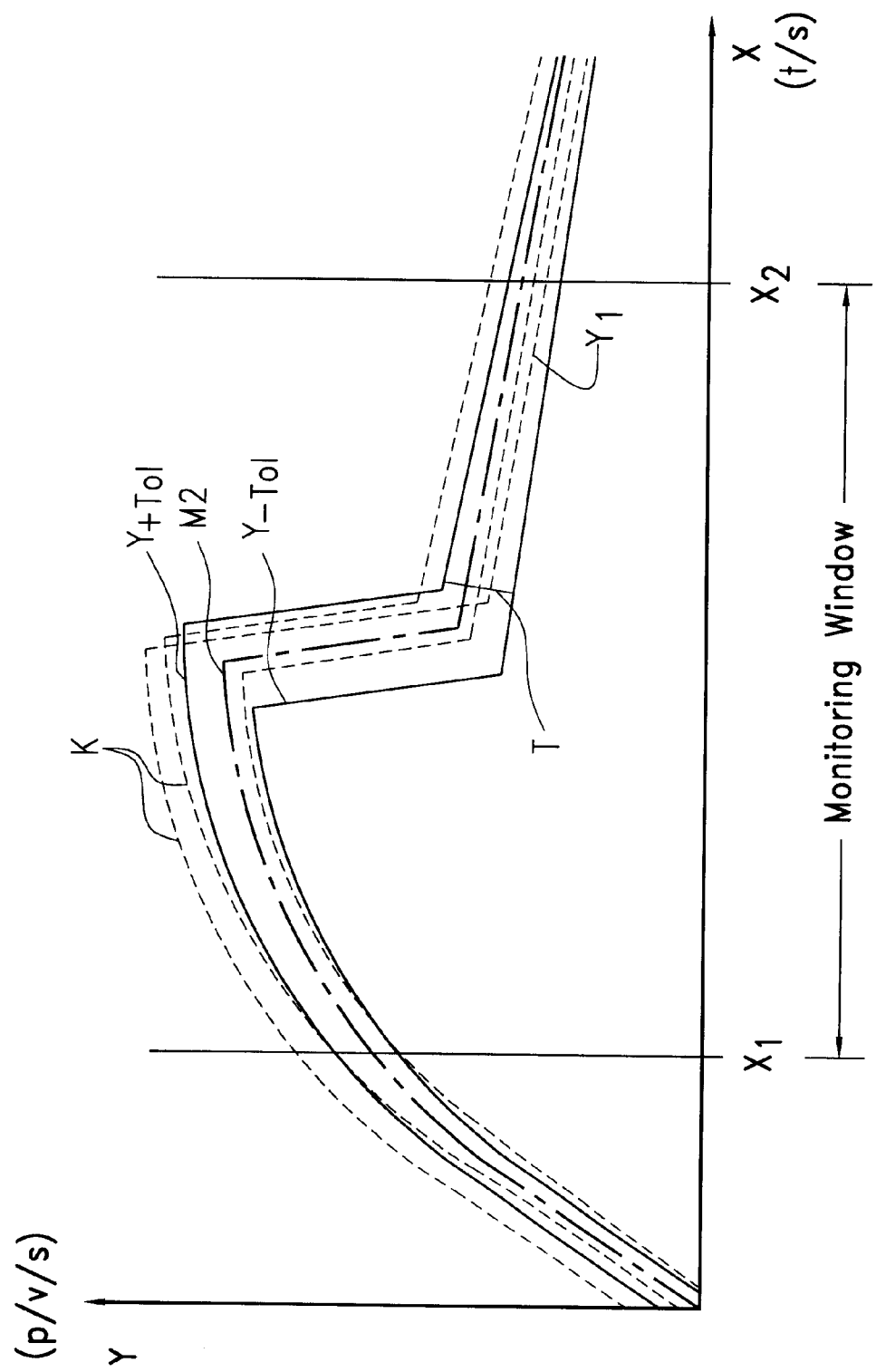
FIG. 2 illustrates a determination of the tolerance band as a result of calculating a standard deviation curve, which is dependent on the x co-ordinate.

The embodiment of the invention according to FIG. 2 differs from the illustration of FIG. 1 initially by the fact that a wider tolerance band, or respectively a wider permissible range T, has now also been determined in the range of fluctuations where the first parameter y drops sharply. Whereas the standard deviation has in fact only been determined in the y direction according to FIG. 1, it is now also determined here in dependence on the x co-ordinate.

As before, a plurality of actual value curves K were averaged to form the mean value curve M2, but this range is then provided with a tolerance $Y_{+Tol}$ or respectively $Y_{-Tol}$.

In such case, the mean value curve is calculated according to the formula:

$$y(x)=1/m\Sigma_{i=t}^{R}y_i(x)$$

with:

y(x)=mean value at point x, $y_i(x)$=actual value curve from the $i^{th}$ measuring cycle, m=number of measuring cycles.

This then leads to the tolerance band, which is dependent on the x co-ordinate, with the tolerance determined according to the following formula:

$$\Delta y(x) = z * \sqrt{\frac{1}{m-1}\left(\sum_{i=1}^{a} y_i^2(x) - y^2(x)\right)}$$

As already explained, z, m and $y_i(x)$ are the standard normal variable, the number of measuring cycles and the value of the first parameter y in dependence on the second parameter x. In this respect, a superimposition of the standard deviations occurs here in dependence on the second parameter and on the standard deviation of the first parameter. The widened range in the outer field of the intense parameter fluctuation indicates that more curves are still permissible curves, which therefore produce good moldings, than was the case in FIG. 1. Furthermore, a smaller tolerance band width is automatically produced in the regions where fewer fluctuations exist, as is apparent, more especially, at the beginning and at the end of the plotted diagram.

An additional possibility resides, as before, in averaging the actual value curves K to form the mean value curve M3 according to FIG. 3. In contrast with the previous possibilities, the standard deviation is calculated in the xy plane perpendicular to the mean value curve M3 to form the tolerance band. In consequence, it is true that the mean value y(x) and the tolerance are determined as before, and the tolerance band curve is then calculated as the curve for y(x) with spacing Δy (x). For simplification, this is explained hereinafter in a vector diagram.

For the mean value curve, the vector is produced in:

$$\Delta y^t(x) = \begin{pmatrix} x \\ y(x) \end{pmatrix}$$

with: $x = \frac{1}{m}\sum_{i=1}^{a} x_i \qquad y(x) = \frac{1}{m}\sum_{i=t}^{a} y_i(x)$ wherein:

x=mean value at point x, $x_i$=value x in the $i^{th}$ measuring cycle, y(x)=mean value at point x, $y_i$=actual value from the $i^{th}$ measuring cycle, m=number of measuring cycles.

This vector can be converted in the normal direction into the vector $$\Delta y_{NEW}^t(x) = \begin{pmatrix} \Delta y_{1.NEW}(x) \\ \Delta y_{2.NEW}(x) \end{pmatrix}$$

with:

$$\Delta y_{1.NEW}(x) = \frac{1}{\sqrt{1+\left(\frac{dy(x)}{dx}\right)^2}} * \Delta y(x) * \frac{dy(x)}{dx}$$

$$\Delta y_{2.NEW}(x) = \frac{1}{\sqrt{1+\left(\frac{dy(x)}{dx}\right)^2}} * \Delta y(x)$$

This has the advantage that a tolerance band can now extend in a uniform width over the entire course, and such band takes account of all of the requirements which occur, more especially, in the region of intense parameter fluctuations. Moreover, there is the possibility, in all three Figures, to define also monitoring windows in which the critical regions mainly lie, since it is known, in practice, that many regions have to be monitored more intensely than others. Variable tolerance widths can also be determined in sections. In such case, the work needed to calculate the standard deviation perpendicular to the mean value curve is tolerated on purpose, although a digital differentiation is extremely inaccurate. Nevertheless, this leads to a reduction in the work needed for controlling and calculating purposes whilst providing an optimized tolerance band for reducing the waste hitherto.

In particular, five types of curves come into consideration as determined curves K with a plastics material injection-molding machine, namely:

p(t)=the function of the pressure p, preferably the hydraulic pressure or internal mold pressure, (first parameter y) over the cycle time t (second parameter x), v(t)=function of the velocity v of the feeding means (first parameter y) over the cycle time t (second parameter x), s(t)=function of the path s of the feeding means (first parameter y) over the cycle time t (second parameter x), p(s)=function of the pressure p, preferably the hydraulic pressure or internal mold pressure, (first parameter y) over the path s of the feeding means (second parameter x), v(s)=function of the velocity v of the feeding means (first parameter y) over the path s of the feeding means (second parameter x).

It is self-evident that this description can be modified, changed and adapted in the most varied of ways, and such modifications, changes and adaptations come within the range of equivalents to the accompanying claims.

What is claimed is:

1. A method for evaluating injection-molded parts, produced in an injection-molding machine, as a good molding or a bad molding, said method comprising:

determining a respective curve of a first parameter (y), which curve indicates changes in the first parameter (y) as a function of a prescribed second parameter (x), said determining operation being performed during a plurality of injection-molding operations wherein non-defective good moldings are produced, to form a group of curves;

averaging the group of curves to form a mean value curve (M2, M3), which mean value curve indicates a mean value of the curves of the first parameter (y) for each value of the second parameter (x);

calculating and determining a standard deviation in dependence on at least one parameter;

setting a permissible range (T) of the at least one parameter along the mean value curve (M2, M3) on the basis of the determined standard deviation;

effecting an actual value assessment of the at least one parameter, which is produced during an actual production of a molding, to check whether the actual value falls within the permissible range (T); and assessing a molding as a good molding when the actual value lies substantially within the permissible range (T), or respectively as a bad molding when the actual value does not lie within the permissible range, wherein, to set the permissible range (T), the standard deviation is calculated in dependence on the second parameter (x).

2. A Method according to claim 1, wherein the calculation of the standard deviation is effected according to the formula:

$$\Delta y(x) = z * \sqrt{\frac{1}{m-1}\left(\sum_{i=1}^{a} y_i^2(x) - y^2(x)\right)}.$$

3. A method according to claim 1, wherein the first parameter (y) is a pressure (p), and the second parameter (x) is a cycle time (t), and in that the determined curve is a function of the pressure (p) over the cycle time (t).

4. A method according to claim 1, wherein the first parameter (y) is a velocity (v) of a feeding means, and the second parameter (x) is a cycle time (t), and in that the determined curve is a function of the velocity (v) over the cycle time (t).

5. A method according to claim 1, wherein the first parameter (y) is a path (s) of a feeding means, and the second parameter (x) is a cycle time (t), and in that the determined curve is a function of the path (s) over the cycle time (t).

6. A method according to claim 1, wherein the first parameter (y) is a pressure (p), and the second parameter (x) is a path (s) of a feeding means, and in that the determined curve is a function of the pressure (p) over the path (s).

7. A method according to claim 1, wherein the first parameter (y) is a velocity (v) of a feeding means, and the second parameter (x) is a path (s) of a feeding means, and in that the determined curve is a function of the velocity (v) over the path (s).

8. A method according to claim 1, wherein the determination of the standard deviation is effected perpendicular to the mean value curve (M3).

9. A method according to claim 8, wherein the first parameter (y) is a pressure (p), and the second parameter (x) is a cycle time (t), and in that the determined curve is a function of the pressure (p) over the cycle time (t).

10. A method according to claim 8, wherein the first parameter (y) is a velocity (v) of a feeding means, and the second parameter (x) is a cycle time (t), and in that the determined curve is a function of the velocity (v) over the cycle time (t).

11. A method according to claim 8, wherein the first parameter (y) is a path (s) of a feeding means, and the second parameter (x) is a cycle time (t), and in that the determined curve is a function of the path (s) over the cycle time (t).

12. A method according to claim 8, wherein the first parameter (y) is a pressure (p), and the second parameter (x) is a path (s) of a feeding means, and in that the determined curve is a function of the pressure (p) over the path (s).

13. A method according to claim 8, wherein the first parameter (y) is a velocity (v) of a feeding means, and the second parameter (x) is a path (s) of the feeding means, and in that the determined curve is a function of the velocity (v) over the path (s).

* * * * *